Figure 1:
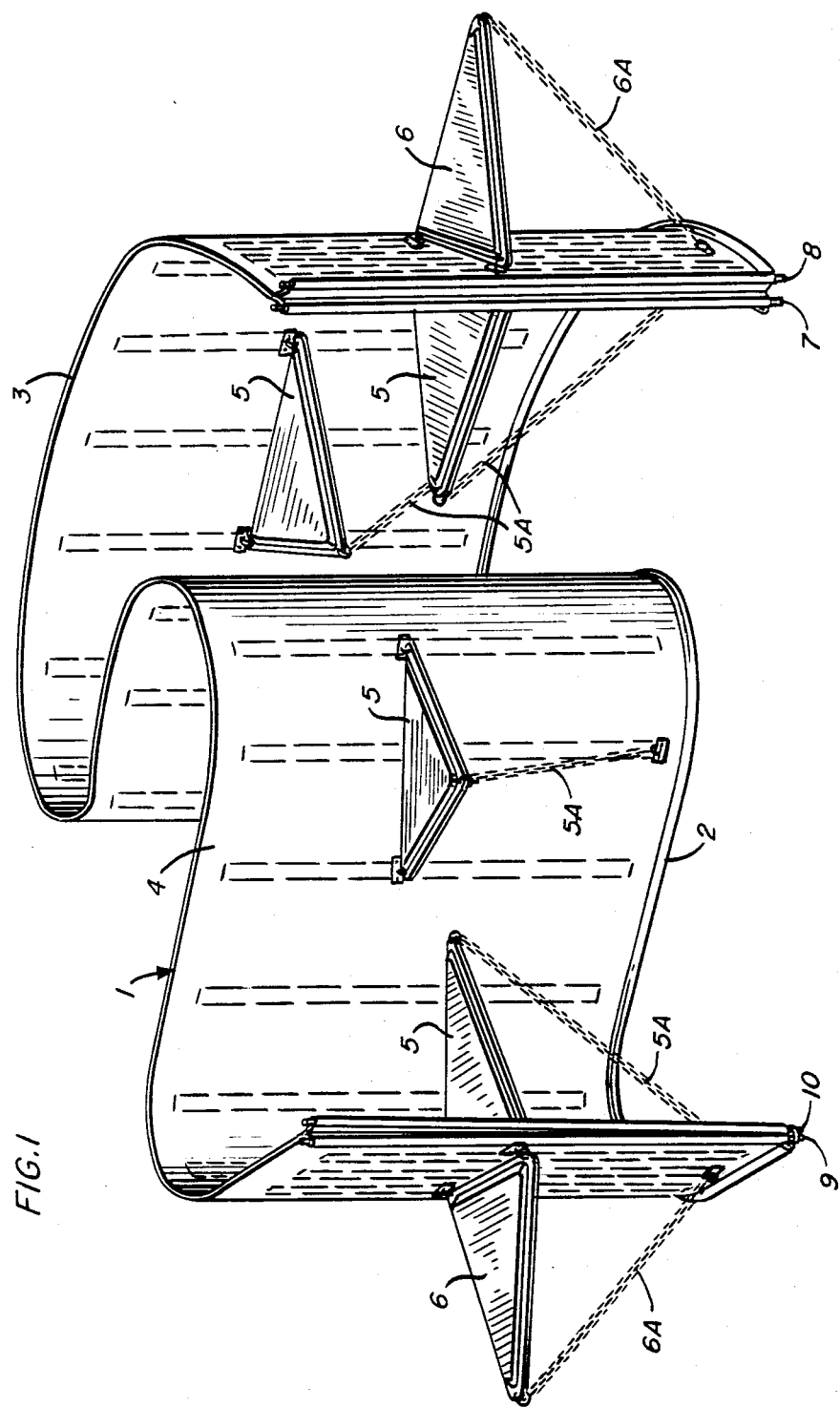

United States Patent [19]

Eriksson

[11] Patent Number: 4,511,285

[45] Date of Patent: Apr. 16, 1985

[54] OIL-CLEARING ELEMENT HAVING TWO OR MORE MOVABLE FLOATING BODIES

[76] Inventor: Hans Eriksson, Nygatan 11, Kristinehamn, Sweden

[21] Appl. No.: 488,546

[22] PCT Filed: Jul. 15, 1982

[86] PCT No.: PCT/SE82/00245

§ 371 Date: Mar. 31, 1983

§ 102(e) Date: Mar. 31, 1983

[87] PCT Pub. No.: WO83/00517

PCT Pub. Date: Feb. 17, 1983

[30] Foreign Application Priority Data

Aug. 7, 1981 [SE] Sweden .................................. 8104731

[51] Int. Cl.³ ............................................. E02B 15/04
[52] U.S. Cl. ......................................... 405/66; 405/70
[58] Field of Search ....................... 405/63, 66, 67, 70, 405/72, 71

[56] References Cited

U.S. PATENT DOCUMENTS

| 3,807,177 | 4/1974 | Oberg | 405/70 X |
| 3,849,989 | 11/1974 | Preus | 405/70 X |
| 3,868,824 | 3/1975 | Thurman | 405/71 |
| 4,155,664 | 5/1979 | Acheson | 405/70 X |
| 4,303,351 | 12/1981 | Milgram | 405/66 |

FOREIGN PATENT DOCUMENTS

| 49446 | 2/1975 | Finland . |
| 209005 | 11/1966 | Sweden . |
| 348780 | 11/1972 | Sweden . |
| 7408210 | 6/1974 | Sweden . |
| 505945 | 5/1971 | Switzerland . |

Primary Examiner—David H. Corbin
Attorney, Agent, or Firm—Dennison, Meserole, Pollack & Scheiner

[57] ABSTRACT

The present invention provides a flexible, rectangular wall (1) which can be immersed purely vertically in a waterway and kept partially immersed by means of sheet-shaped floating bodies (5-6) arranged perpendicular to the wall element (1) on both sides thereof.

3 Claims, 6 Drawing Figures

U.S. Patent Apr. 16, 1985 Sheet 3 of 3 4,511,285

OIL-CLEARING ELEMENT HAVING TWO OR MORE MOVABLE FLOATING BODIES

The present invention relates to an oil-clearing element. In the event of undesired oil discharge in waterways it is desirable to be able to confine the oil and also to absorb it. Several proposals have been offered for surrounding the oil. Inflatable rubber hoses, for instance, have been placed on the surface of the waterway for this purpose. Other suggestions have also been forthcoming but none has so far functioned satisfactorily.

The object of the present invention is to provide an oil-clearing element enabling noticeably better confinement of undesired oil discharges in waterways. The element according to the present invention constitutes an elastomeric wall element which is immersed in a waterway so that it remains vertical, with a part above the water surface and preferably a large portion below the water surface. The wall element is provided with a number of absorption elements. The element is preferably rectangular and provided at its ends with splicing elements enabling several wall elements to be joined together. The element is provided on both sides with a number of sheet-shaped elements each pivotable about an axial parallel to the upper and lower edges of the wall element. The sheet-shaped elements can assume two positions: one perpendicular to the surface of the wall element and one in which the sheet-shaped elements abut the surface of the wall element.

The sheet-shaped elements are provided with restraining members such as cord, wire, chain or the like so that a sheet-shaped element moving from its abutting position to a position perpendicular to the wall element does not exceed the latter position.

Each wall element is provided at its ends with one or more rod-shaped elements. Said elements are used for connecting to similar rod-shaped elements in an adjacent wall element.

Further characteristics of the present invention are revealed in the following claims.

Figure 2:
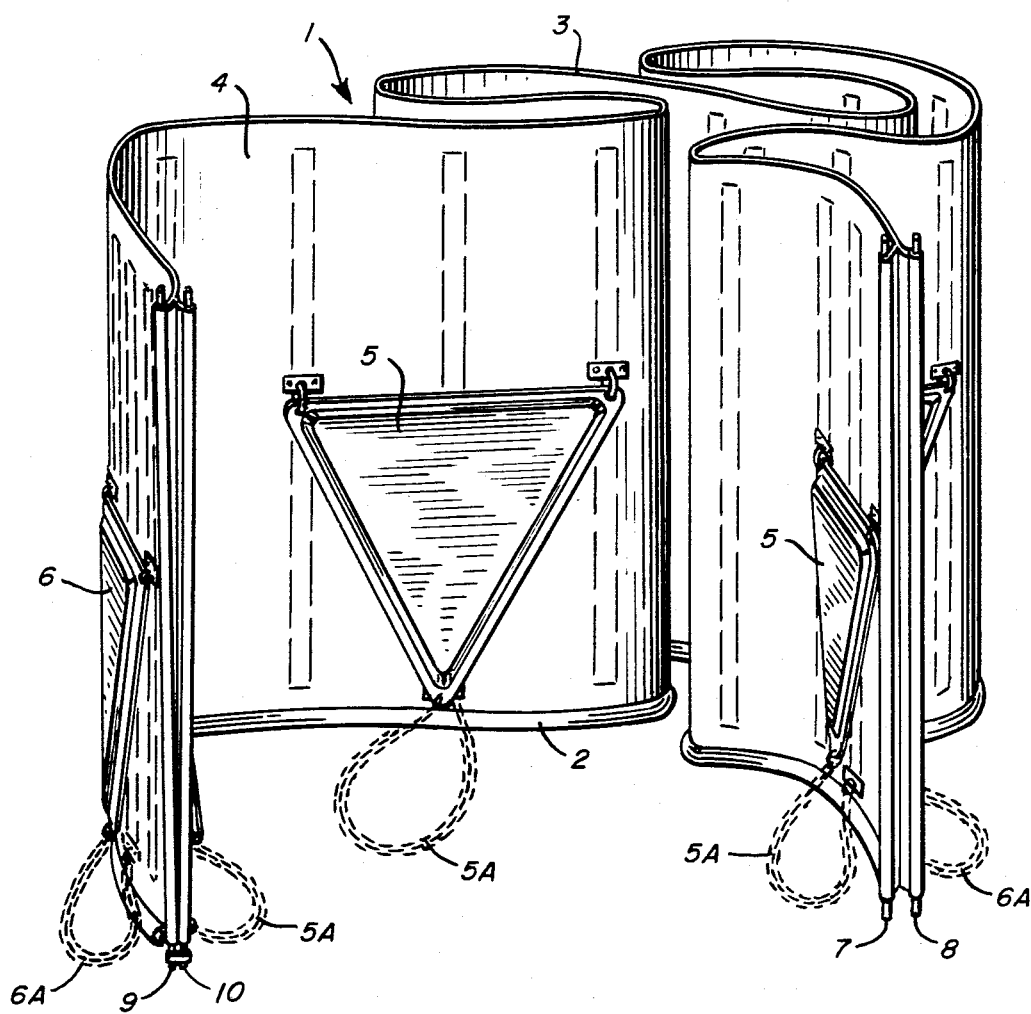
Figure 3:
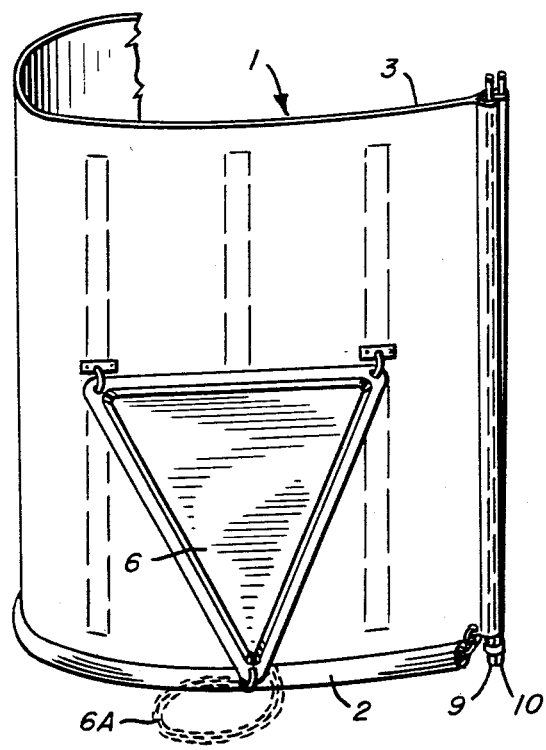
Figure 4:
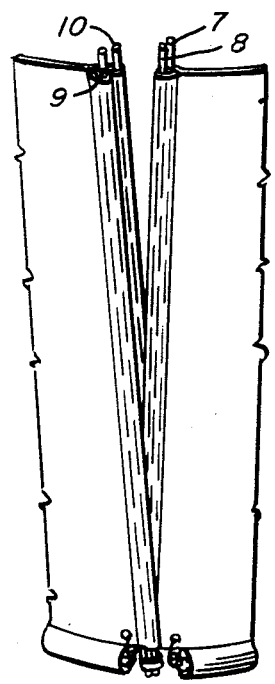
Figure 5:
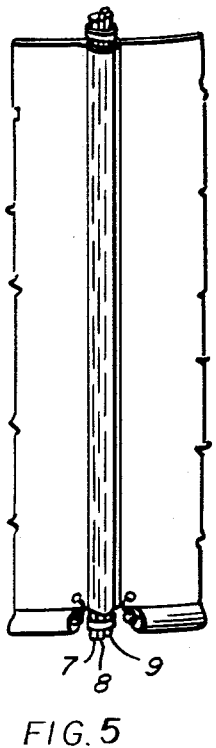
Figure 6:
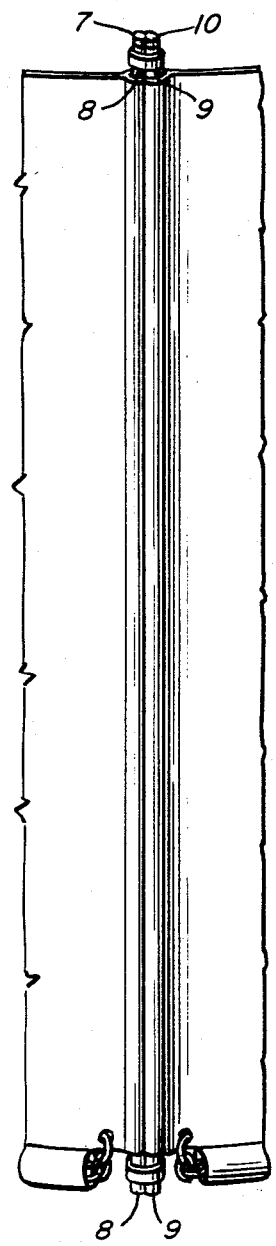

The present invention will be further described with reference to the three accompanying sheets of drawings, in which FIG. 1 shows a wall element acting as oil-clearing element and provided with raised sheet-shaped elements on both sides, FIG. 2 shows the same wall element as FIG. 1, but with the sheet-shaped elements lowered and in position for rolling up, and FIGS. 3–6 show how one wall element is joined to an adjacent element.

The drawings show a rectangular wall element 1 made of elastomeric material such as plastic, rubber-impregnated fabric or the like. The element is provided with a number of transverse bracing elements spaced from each other, which may be attached in the wall element itself. These are to keep the wall element taut in the transverse direction. The wall element 1 has a lower edge 2 and an upper edge 3. The lower edge 2 is suitably shaped with a longitudinal channel or tubular section in which weights can be placed, if necessary.

Along a line parallel to the edges 2 and 3 are placed a number of sheet-shaped elements 5 and 6 on both sides of the wall element 1. The sheet-shaped elements 5 and 6 are pivotable to enable abutment against the surfaces of the wall element or to assume a position forming an angle to the wall element. The angle selected is preferably 90° C. The sheet-shaped elements cannot exceed said position due to restraining elements 5A or 6A which may consist of a steel wire, cord or other similar means. The sheet-shaped elements may be arbitrary in shape and be made of any suitable material. It is preferred that the sheet-shaped elements be in the form of floating bodies which may be solid or hollow. The wall element 1 is provided at both ends with two rods 7–8 and 9–10. These rods are intended either to join the ends of the wall element together or to join several identical wall elements together. Joining is effected by providing the ends of the rods 7, 8, 9 and 10 with a ring or clamping means at the top and bottom. Other arrangements are also possible to join two ends to form one wall element.

Normally, a wall element according to the present invention is rolled up as intimated in FIG. 2.

When an oil discharge is to be surrounded a wall element according to FIG. 1 is lowered into the waterway and will then assume a substantially vertical position, being held in this position thanks to the existence of the sheet-shaped elements 5 and 6 which are raised to the position shown in FIG. 1 when the wall element is lowered into the water. If one oil-clearing element is sufficient, the ends are joined together thus surrounding the oil-discharge. If the discharge is too large for this, several wall elements in accordance with FIG. 1 must be joined together as shown and demonstrated in FIG. 3.

I claim:

1. Oil clearing apparatus for preventing the spread of oil in waterways, lakes, sea and the like, comprising a flexible rectangular wall element including opposed sides, spaced parallel longitudinal edges, and spaced ends, said rectangular wall element being provided with a number of floating bodies on both sides thereof along a line parallel to said longitudinal edges, said bodies being sheet-like and pivotable about said line whereby each sheet may selectively assume a substantially perpendicular position in relation to the wall element, the rectangular wall element being provided adjacent its ends with joinder means for enabling another such wall element to be joined onto each end, said joinder means, adjacent each wall element end, comprising a pair of extending flexible strips joined and hinged together and along said end, said strips providing a pair of elongate flexible free end edges extending along each end and in a direction normal to said longitudinal edges of the wall element, a rod element engaged with and extending along each of said free end edges, each rod element including end portions protruding beyond the longitudinal edges of the wall element, the pair of flexible strips on said wall element end extending outward of the wall element end and outward relative to each other whereby to selectively receive laterally therebetween the rod element of a further wall element with the corresponding end portions of the rod elements aligned for reception of a retaining ring element thereabout to thereby bunch the protruding end portions of the rod elements of two adjacent wall elements together and provide an elongate joining of the wall elements one to another.

2. In an oil discharge confinement system including flexible wall elements with opposed ends, means for joining together two ends of said flexible wall elements, said means comprising a pair of elongate strips longitudinally hinged together and to each wall element end along the length thereof whereby to provide a pair of elongate free end edges along each wall element end, an elongate rod element engaged with and extending along each of said free edges, each rod element including end portions protruding longitudinally beyond the corresponding free edge, the pair of strips at each wall element end extending outward of said wall element end and each other whereby to receive laterally therebetween a rod element of another wall element end with the end portions of the corresponding rod elements aligned for engagement of retaining means thereabout to thereby bunch the rod elements of the two wall element ends together, and provide an elongate joining of the wall element ends one to another.

3. In the system of claim 2, said retaining means comprising ring elements receivable about aligned end portions of said rod elements.

* * * * *